(12) United States Patent (10) Patent No.: US 12,688,694 B2
Yamaguchi (45) Date of Patent: Jul. 21, 2026

(54) SELF-CHECKOUT MONITORING SYSTEM, SELF-CHECKOUT MONITORING METHOD, AND NON-TRANSITORY COMPUTER READABLE MEDIUM

(71) Applicant: STEERETAIL CO., LTD., Kawasaki (JP)

(72) Inventor: Shogo Yamaguchi, Kanagawa (JP)

(73) Assignee: SteeRetail Co., Ltd., Kawasaki (JP)

( * ) Notice: Subject to any disclaimer, the term of this patent is extended or adjusted under 35 U.S.C. 154(b) by 321 days.

(21) Appl. No.: 18/410,144

(22) Filed: Jan. 11, 2024

(65) Prior Publication Data

US 2024/0251061 A1     Jul. 25, 2024

(30) Foreign Application Priority Data

Jan. 20, 2023     (JP) ................................ 2023-007340

(51) Int. Cl.
    *G06V 20/52*     (2022.01)
    *G07G 3/00*     (2006.01)

(52) U.S. Cl.
    CPC ............. *G06V 20/52* (2022.01); *G07G 3/003* (2013.01)

(58) Field of Classification Search
    CPC ............................... G06V 20/52; G07G 3/003
    See application file for complete search history.

(56) References Cited

U.S. PATENT DOCUMENTS

2019/0230322 A1*   7/2019   Muramatsu ............. H04W 4/70
2022/0165060 A1*   5/2022   Eichel .................... G06V 20/64

FOREIGN PATENT DOCUMENTS

| | | | | |
|---|---|---|---|---|
| JP | H01-277089 A | | 11/1989 | |
| JP | H0946693 A | * | 2/1997 | |
| JP | 2015-153224 A | | 8/2015 | |
| JP | 2021-157420 A | | 10/2021 | |
| JP | 2022-108991 A | | 7/2022 | |
| JP | 2023031766 A | * | 3/2023 | |
| WO | WO-2016043102 A1 | * | 3/2016 | ............. H04N 23/61 |
| WO | WO-2023056229 A1 | * | 4/2023 | ............. G07G 3/006 |

OTHER PUBLICATIONS

JP Office Action for JP Application No. 2023-007340, mailed on Feb. 6, 2024 with English Translation.

* cited by examiner

*Primary Examiner* — Florian M Zeender
*Assistant Examiner* — Kimberly S. Bursum
(74) *Attorney, Agent, or Firm* — Tutunjian & Bitetto, P.C.

(57) ABSTRACT

A self-checkout monitoring system, a self-checkout monitoring method, and a non-transitory computer readable medium capable of monitoring fraud committed by customers at a low cost are provided. A self-checkout monitoring system according to the present disclosure includes: an image-capturing unit configured to capture an image of a plurality of self-checkout machines from above; and an image distribution unit configured to divide the image of the plurality of self-checkout machines captured by the image-capturing unit for each of the plurality of self-checkout machines and distribute the divided images to the plurality of respective self-checkout machines. The self-checkout monitoring system causes display units which display customer's shopping information in the plurality of respective self-checkout machines to display the divided images of the self-checkout machines distributed from the image distribution unit.

15 Claims, 11 Drawing Sheets

SELF-CHECKOUT MONITORING SYSTEM, SELF-CHECKOUT MONITORING METHOD, AND NON-TRANSITORY COMPUTER READABLE MEDIUM

INCORPORATION BY REFERENCE

This application is based upon and claims the benefit of priority from Japanese patent application No. 2023-007340, filed on Jan. 20, 2023, the disclosure of which is incorporated herein in its entirety by reference.

TECHNICAL FIELD

The present disclosure relates to a self-checkout monitoring system, a self-checkout monitoring method, and a non-transitory computer readable medium.

BACKGROUND ART

In recent years, self-checkout machines have been introduced in stores to reduce labor shortages. Customers scan product barcodes into a barcode scanner of such a self-checkout machine to perform payment processing by themselves, which may enable fraud to be committed.

In order to prevent the aforementioned fraud from being committed by customers, monitoring cameras are attached to the respective self-checkout machines, and a store staff member monitors the payment processing performed by the customers.

Japanese Unexamined Patent Application Publication No. H01-277089 discloses a monitoring system capable of monitoring, by using one monitoring camera, an area to be monitored. The monitoring system disclosed in Japanese Unexamined Patent Application Publication No. H01-277089 divides an image captured by a wide-angle camera installed in a ceiling into a predetermined number of images, performs image processing, and corrects the images to images captured by a normal lens.

In a store, in order to prevent customers from committing fraud, monitoring cameras need to be installed in the respective self-checkout machines, which requires a high expenditure.

Note that Japanese Unexamined Patent Application Publication No. H01-277089 discloses nothing about self-checkout machines.

SUMMARY

In view of the aforementioned problem, an object of the present disclosure is to provide a self-checkout monitoring system, a self-checkout monitoring method, and a self-checkout monitoring program capable of monitoring fraud committed by customers at a low cost.

A self-checkout monitoring system according to one aspect of the present disclosure includes: an image-capturing unit configured to capture an image of a plurality of self-checkout machines from above; and an image distribution unit configured to divide the image of the plurality of self-checkout machines captured by the image-capturing unit for each of the plurality of self-checkout machines and distribute the divided images to the plurality of respective self-checkout machines, in which display units which display customer's shopping information in the plurality of respective self-checkout machines are caused to display the divided images of the self-checkout machines distributed from the image distribution unit.

A self-checkout monitoring method according to one aspect of the present disclosure causes a computer to execute processing of: dividing an image of a plurality of self-checkout machines captured from above for each of the plurality of self-checkout machines and distributing the divided images to the plurality of respective self-checkout machines; and causing display units which display customer's shopping information in the plurality of respective self-checkout machines to display the divided images of the self-checkout machines that have been distributed.

A non-transitory computer readable medium according to one aspect of the present disclosure causes a computer to execute processing of: dividing an image of a plurality of self-checkout machines captured from above for each of the plurality of self-checkout machines and distributing the divided images to the plurality of respective self-checkout machines; and causing display units which display customer's shopping information in the plurality of respective self-checkout machines to display the divided images of the self-checkout machines that have been distributed.

BRIEF DESCRIPTION OF DRAWINGS

The above and other aspects, features and advantages of the present disclosure will become more apparent from the following description of certain exemplary embodiments when taken in conjunction with the accompanying drawings, in which.

EXAMPLE EMBODIMENT

Hereinafter, the present disclosure will be described based on example embodiments of the present disclosure. However, the disclosure set forth in claims is not limited to the following example embodiments. Moreover, it is not absolutely necessary to provide all the configurations to be described in the following example embodiments as means for solving the problems. Throughout the drawings, the same symbols are attached to the same elements and over-lapping descriptions are omitted as necessary.

First Example Embodiment

Figure 1:
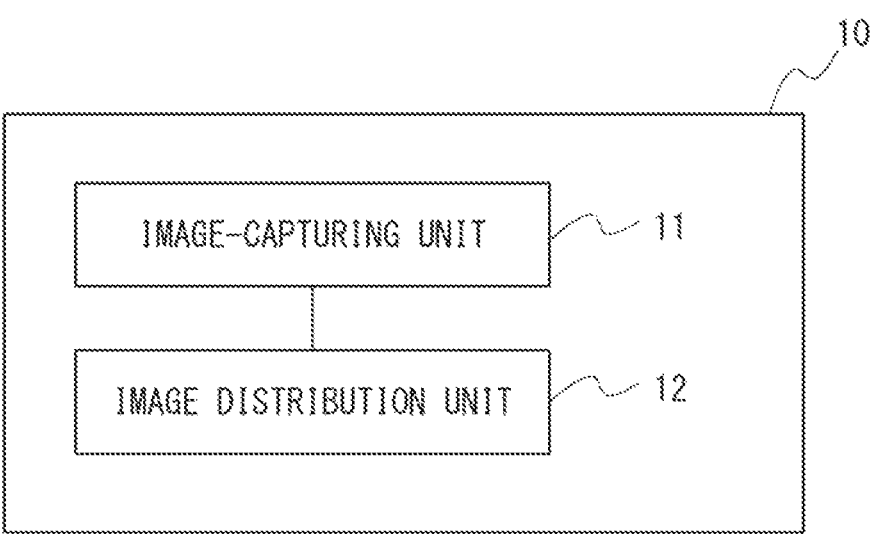
FIG. 1 is a block diagram showing a configuration of a self-checkout monitoring system according to the present disclosure.

Hereinafter, with reference to the drawings, a self-check-out monitoring system according to the present disclosure will be described. FIG. 1 is a block diagram showing a configuration of the self-checkout monitoring system according to the present disclosure. A self-checkout moni-toring system 10 according to the present disclosure includes an image-capturing unit 11 and an image distribution unit 12.

First, the image-capturing unit 11 will be described. The image-capturing unit 11 captures an image of a plurality of self-checkout machines from above. The image-capturing unit 11 is a wide-angle camera installed in a place where the image-capturing unit 11 can capture an image of a plurality of self-checkout machines at one time. The image-capturing unit 11 is installed, for example, in a ceiling. However, this is merely an example, and it is sufficient that the image-capturing unit 11 be installed in a place on a nearby wall higher than the self-checkout machines.

The number of image-capturing units 11 may be any number that is smaller than the number of self-checkout machines. Further, the number of image-capturing units 11 as compared to the number of self-checkout machines is preferably minimized so that the cost required to prevent customers from committing fraud can be reduced. For example, the number of image-capturing units 11 that are installed to capture an image of four self-checkout machines is preferably one, rather than two.

Now, the self-checkout machine will be described. Cus-tomers scans product barcodes into a barcode scanner of such a self-checkout machine to perform payment process-ing. More specifically, a display unit of the self-checkout machine displays shopping information on a customer. The customer checks the products he/she wants to purchase and the amount of payment, and pays money.

Next, the image distribution unit 12 will be described. The image distribution unit 12 divides the image of the plurality of self-checkout machines captured by the image-capturing unit 11 for each of the plurality of self-checkout machines. And then, the image distribution unit 12 distributes the divided images to the plurality of respective self-checkout machines. The image distribution unit 12 equally divides the image of the plurality of self-checkout machines in such a way that each image includes one self-checkout machine. However, this is merely an example, and the image distri-bution unit 12 may not equally divide the image as long as the image of the plurality of self-checkout machines can be divided in such a way that each image includes one self-checkout machine. Further, the images of the plurality of self-checkout machines divided by the image distribution unit 12 are referred to as divided images. As a matter of course, the image distribution unit 12 creates divided images whose number corresponds to that of self-checkout machines.

The image distribution unit 12 distributes the divided images to the respective self-checkout machines included in the divided images. According to the aforementioned con-figuration, the self-checkout monitoring system 10 accord-ing to the first example embodiment causes display units which display customer's shopping information in the plu-rality of respective self-checkout machines to display the divided images of the respective self-checkout machines distributed from the image distribution unit 12. In the self-checkout monitoring system 10, images captured by the image-capturing unit 11 are distributed by the image distri-bution unit 12 in real time. That is, the display units of the self-checkout machines display the images captured by the image-capturing unit 11 in real time.

<Self-Checkout Monitoring Method>

Figure 2:
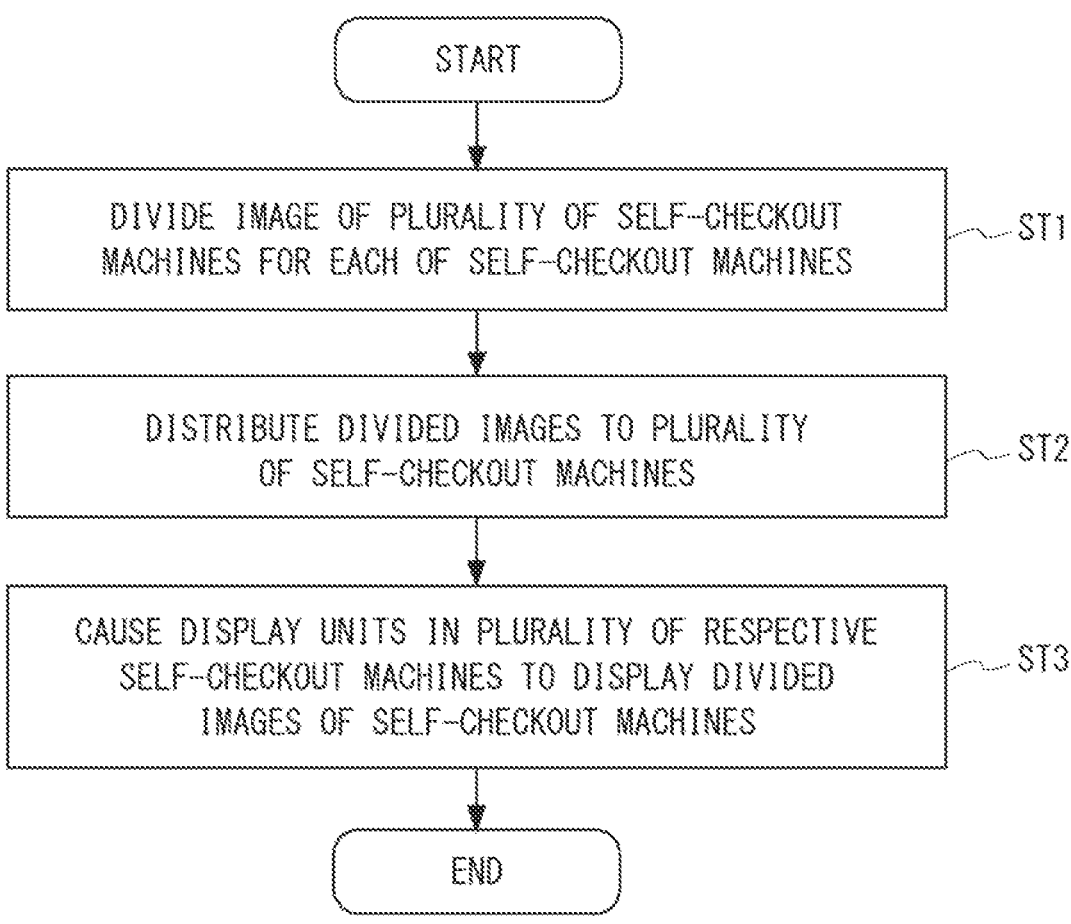
FIG. 2 is a flowchart illustrating a self-checkout monitoring method according to the present disclosure.

Next, a self-checkout monitoring method according to the present disclosure will be described. FIG. 2 is a flowchart illustrating the self-checkout monitoring method according to the present disclosure.

First, an image of a plurality of self-checkout machines captured from above is divided for each of a plurality of self-checkout machines (Step ST1). More specifically, the image of the plurality of self-checkout machines is equally divided in such a way that each image includes one self-checkout machine, thereby creating divided images.

Next, the divided images are distributed to the plurality of respective self-checkout machines (Step ST2). More spe-cifically, the divided images are distributed to the respective self-checkout machines included in the divided images.

Next, the display units which display customer's shop-ping information in the plurality of respective self-checkout machines are caused to display the distributed divided images of the self-checkout machines (Step ST3).

As described above, the self-checkout monitoring system 10 according to the present disclosure causes the display units of the self-checkout machines used by customers to display the images of the self-checkout machines. Accord-ingly, the self-checkout monitoring system 10 notifies the customers that it is monitoring them, whereby it is possible to reduce the temptation of customers to commit fraud. Further, since a plurality of self-checkout machines are monitored by using one camera, cost required to prevent customers from committing fraud can be reduced. It is therefore possible to monitor fraud committed by customers at a low cost.

Second Example Embodiment

Figure 3:
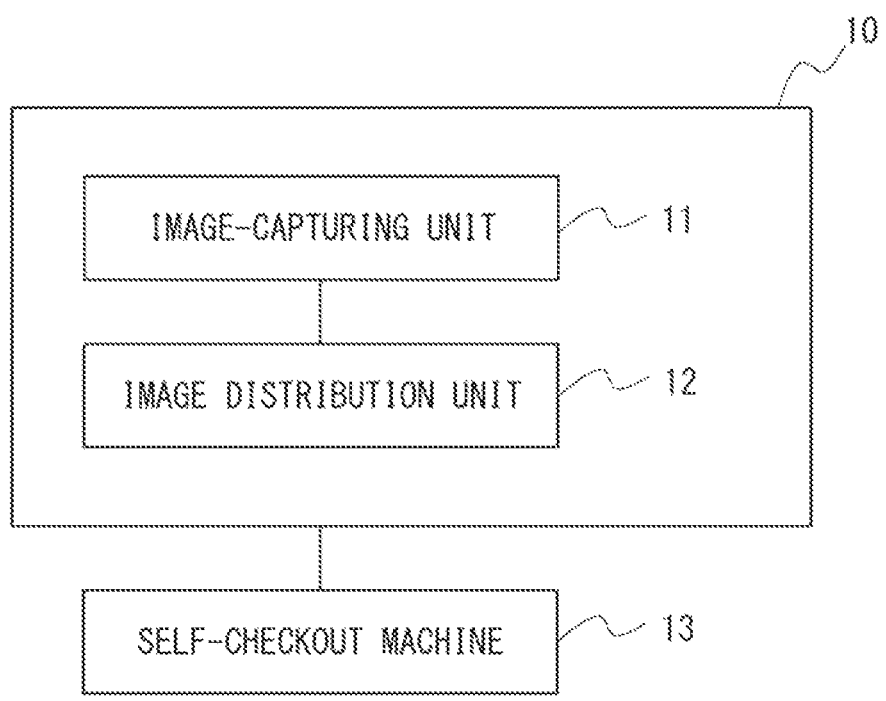
FIG. 3 is a block diagram showing a configuration of the self-checkout monitoring system according to the present disclosure.

Hereinafter, with reference to the drawings, a self-check-out monitoring system according to the present disclosure will be described. FIG. 3 is a block diagram showing a configuration of the self-checkout monitoring system according to the present disclosure. As shown in FIG. 3, the self-checkout monitoring system according to the present disclosure includes an image-capturing unit 11 and an image distribution unit 12. A self-checkout machine 13 includes a display unit which displays customer's shopping informa-tion and displays the divided image of this self-checkout machine distributed from the image distribution unit 12.

Figure 4:
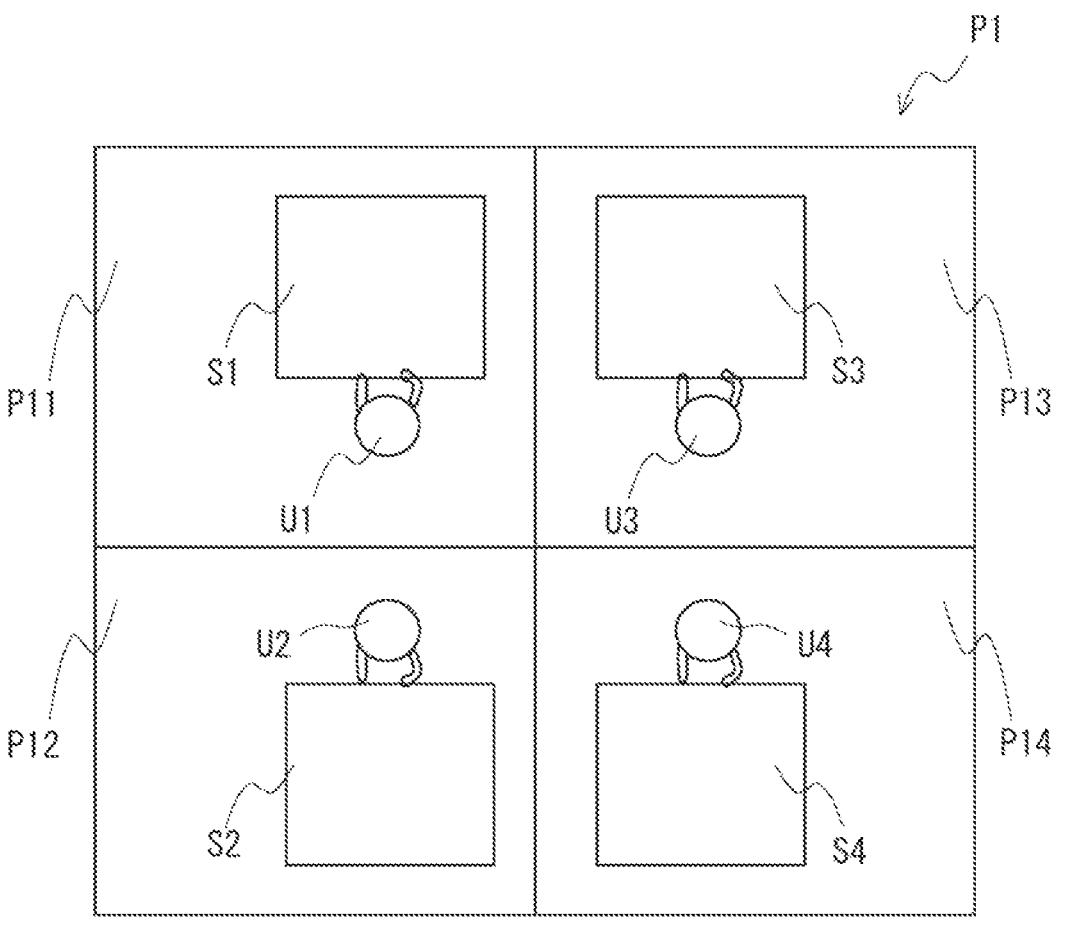
FIG. 4 is one example of an image captured by an image-capturing unit of the self-checkout monitoring system according to the present disclosure from above.

With reference to FIG. 4, the image-capturing unit 11 and the image distribution unit 12 will be described. FIG. 4 is one example of an image captured by the image-capturing unit of the self-checkout monitoring system according to the present disclosure from above.

As shown in FIG. 4, the image-capturing unit 11 captures an image P1 in such a manner that the image P1 includes all the self-checkout machines S1-S4 in the store. The image P1 captured by the image-capturing unit 11 includes customers U1-U4 who are using the self-checkout machines S1-S4, respectively.

As shown in FIG. 4, the image distribution unit 12 divides the image of the plurality of self-checkout machines cap-tured by the image-capturing unit 11 for each of the plurality of self-checkout machines. More specifically, the image distribution unit 12 divides the image P1 captured by the image-capturing unit 11 into four parts to create divided images P11-P14. The divided image P11 includes the self-checkout machine S1. The divided image P12 includes the self-checkout machine S2. The divided image P13 includes the self-checkout machine S3. The divided image P14 includes the self-checkout machine S4. In this manner, the image distribution unit 12 divides the image P1 captured by the image-capturing unit 11 in such a way that each of the divided images includes one self-checkout machine, thereby creating four divided images of the self-checkout machines S1-S4. Note that the divided images P11-P14 respectively include the customers U1-U4 who are using the self-checkout machines S1-S4.

Further, the image distribution unit 12 respectively distributes the divided images P11-P14 to the self-checkout machines S1-S4 included in the divided images P11-P14. More specifically, the image distribution unit 12 distributes the divided image P11 to the self-checkout machine S1. The image distribution unit 12 distributes the divided image P12 to the self-checkout machine S2. The image distribution unit 12 distributes the divided image P13 to the self-checkout machine S3. The image distribution unit 12 distributes the divided image P14 to the self-checkout machine S4.

Figure 5:
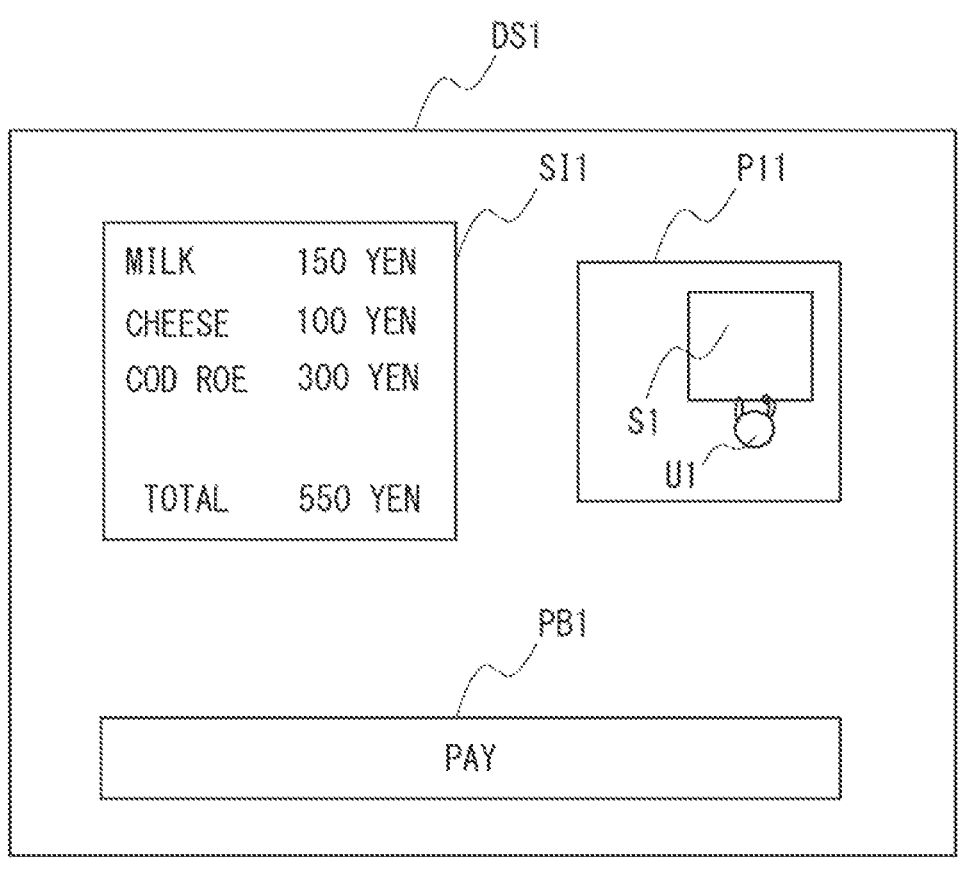
FIG. 5 is one example of a display unit of a self-checkout machine.

The self-checkout monitoring system 10 causes display units which display shopping information of the customers in the respective self-checkout machines S1-S4 to display the divided images of the self-checkout machines distributed from the image distribution unit 12. This configuration will be described in more detail with reference to FIG. 5. FIG. 5 is one example of a display unit of a self-checkout machine.

As shown in FIG. 5, a display unit DS1 of the self-checkout machine S1 displays shopping information SI1, the divided image P11, and a payment button PB1. The shopping information SI1 shows products and the prices thereof obtained by the customer U1 by scanning the barcodes of these products into the barcode scanner of the self-checkout machine. The divided image P11 is the divided image distributed to the self-checkout machine S1 by the image distribution unit 12. In the example shown in FIG. 5, the display unit DS1 is a display unit of the self-checkout machine S1. Therefore, the divided image P11 including the self-checkout machine S1 is displayed. The customer U1 scans barcodes of all the products he/she wants to purchase into the barcode scanner of the self-checkout machine, presses the payment button PB1, and performs payment processing.

As shown in FIG. 5, the display unit DS1 of the self-checkout machine S1 displays the divided image P11 including the self-checkout machine S1. Accordingly, the self-checkout monitoring system 10 notifies the customer U1 who is using the self-checkout machine S1 that it is monitoring him/her, whereby it is possible to reduce the temptation for the customer U1 to commit fraud.

<Identification by Image Distribution Unit>

Figure 6:
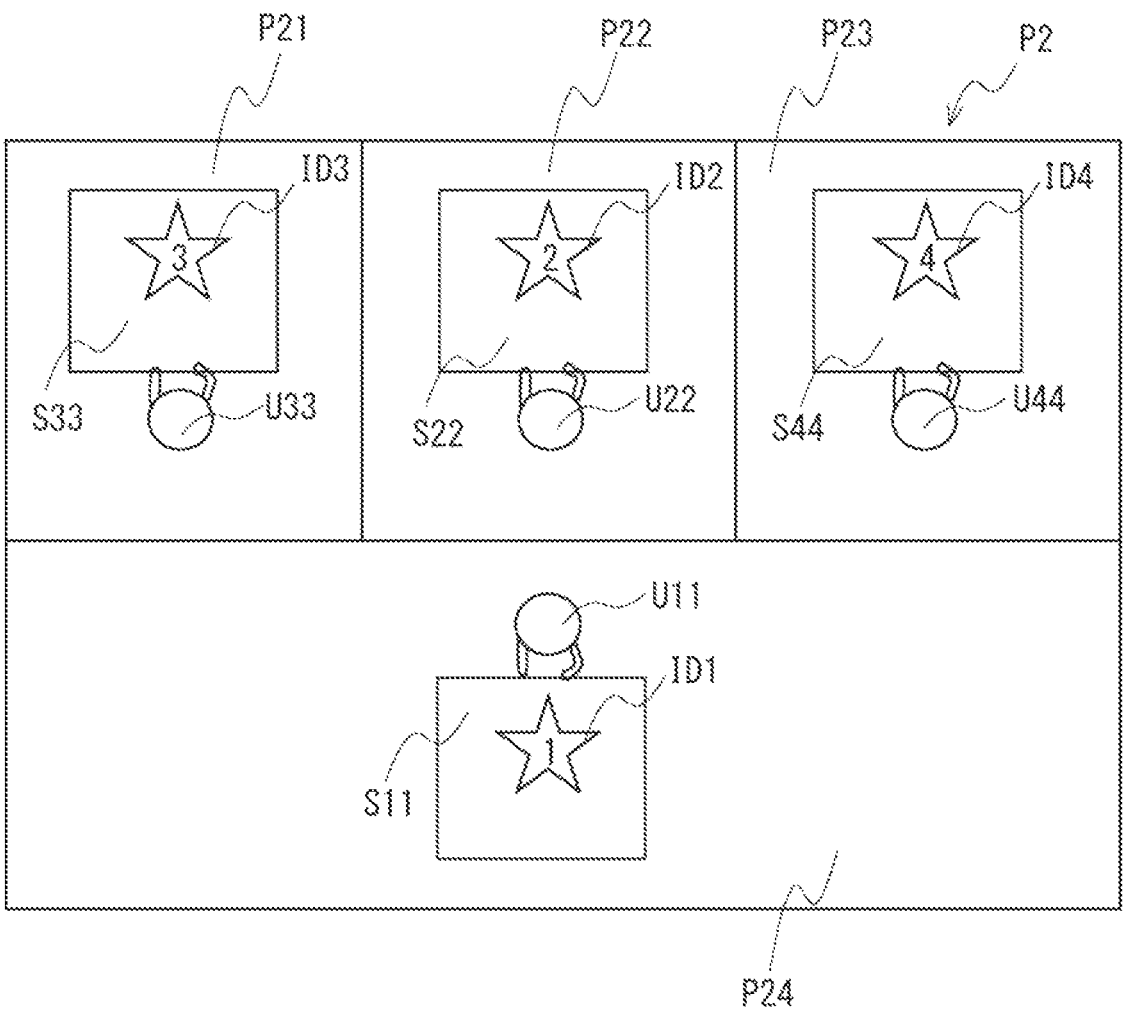
FIG. 6 is one example of an image captured by the image-capturing unit of the self-checkout monitoring system according to the present disclosure from above.
Figure 7:
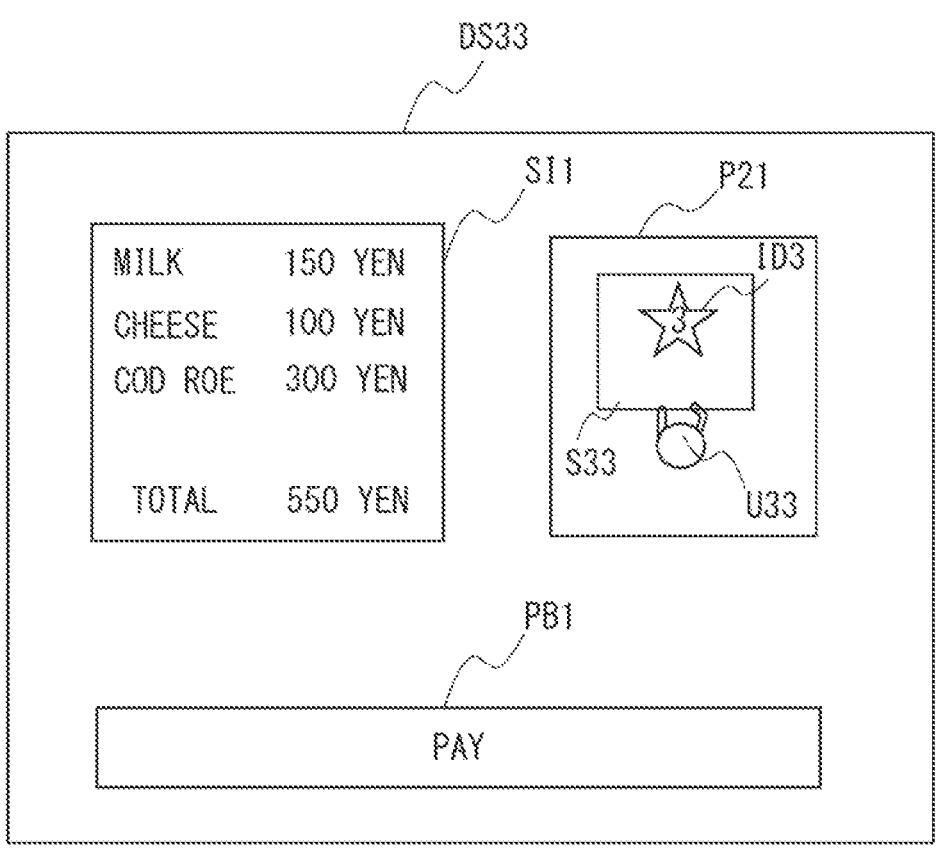
FIG. 7 is one example of the display unit of the self-checkout machine.

Here, identification information items for identifying the self-checkout machines may be attached to the plurality of respective self-checkout machines, and the image distribution unit 12 may identify a self-checkout machine included in a divided image based on the identification information items. This configuration will be described in more detail with reference to FIGS. 6 and 7. FIG. 6 is one example of an image captured by the image-capturing unit of the self-checkout monitoring system according to the present disclosure from above. FIG. 7 is one example of a display unit of the self-checkout machine.

As shown in FIG. 6, identification information items for identifying the self-checkout machines are attached to the plurality of respective self-checkout machines. An identification information ID1 is attached to a self-checkout machine S11. An identification information ID2 is attached to a self-checkout machine S22. An identification information ID3 is attached to a self-checkout machine S33. An identification information ID4 is attached to a self-checkout machine S44. In the example shown in FIG. 6, asterisk marks are attached as the identification information items. However, this is merely an example, and symbols, numbers, or barcodes with which the respective self-checkout machines can be identified may instead be used.

As shown in FIG. 6, the image distribution unit 12 divides an image P2 of the plurality of self-checkout machines captured by the image-capturing unit 11 for each of the plurality of self-checkout machines. More specifically, the image distribution unit 12 divides the image P2 captured by the image-capturing unit 11 into four parts to create divided images P21-P24. The divided image P21 includes the self-checkout machine S33. The divided image P22 includes the self-checkout machine S22. The divided image P23 includes the self-checkout machine S44. The divided image P24 includes the self-checkout machine S11. In this manner, the image distribution unit 12 divides the image P2 captured by the image-capturing unit 11 in such a way that each divided image includes one self-checkout machine, thereby creating divided images of the four respective self-checkout machines S11, S22, S33, and S44.

As shown in FIG. 6, the divided image P21 includes a customer U33 who is using the self-checkout machine S33. The divided image P22 includes a customer U22 who is using the self-checkout machine S22. The divided image P23 includes a customer U44 who is using the self-checkout machine S44. The divided image P24 includes a customer U11 who is using the self-checkout machine S11.

The image distribution unit 12 identifies which self-checkout machines are included in the divided images P21-P24 based on the identification information items, and distributes these divided images P21-P24 to the self-checkout machines to which the identified identification information items are attached. More specifically, the image distribution unit 12 identifies the identification information ID3 included in the divided image P21. The image distribution unit 12 distributes the divided image P21 to the self-checkout machine S33 to which the identification information ID3 is attached. Likewise, the image distribution unit 12 distributes the divided image P22 to the self-checkout machine S22 to which the identification information ID2 is attached. The image distribution unit 12 distributes the divided image P23 to the self-checkout machine S44 to which the identification information ID4 is attached. The image distribution unit 12 distributes the divided image P24 to the self-checkout machine S11 to which the identification information ID1 is attached.

The self-checkout monitoring system 10 causes the display units which display shopping information of the customers in the self-checkout machines S11, S22, S33, and S44 to display the divided images of the self-checkout machines distributed from the image distribution unit 12. This configuration will be described in more detail with reference to FIG. 7.

As shown in FIG. 7, the display unit DS33 of the self-checkout machine S33 displays shopping information SI1, the divided image P21, and a payment button PB1. Since the shopping information SI1 and the payment button PB1 are similar to those shown in FIG. 5, the descriptions thereof will be omitted. The divided image P21 is a divided image distributed to the self-checkout machine S33 by the image distribution unit 12. In the example shown in FIG. 7, the display unit DS33 is a display unit of the self-checkout machine S33. Therefore, the display unit DS33 displays the divided image P21 including the self-checkout machine S33. Accordingly, the self-checkout monitoring system 10 notifies the customer U33 who is using the self-checkout machine S33 that it is monitoring him/her, whereby it is possible to reduce the temptation for the customer U33 to commit fraud.

As described above, the self-checkout monitoring system 10 according to the present disclosure causes display units of self-checkout machines used by customers to display divided images of these self-checkout machines. Accordingly, the self-checkout monitoring system 10 notifies the customers that it is monitoring them, whereby it is possible to reduce the temptation of customers to commit fraud. Further, a plurality of self-checkout machines are monitored by using one camera, whereby the cost required to prevent customers from committing fraud can be reduced. It is therefore possible to monitor fraud committed by customers at a low cost.

Further, the self-checkout monitoring system 10 according to the present disclosure identifies, based on identification information items attached to the self-checkout machines, the self-checkout machines included in the divided images and distributes the divided images to the respective self-checkout machines. Accordingly, even when the positions where the self-checkout machines are installed are changed due to, for example, renovation of the store, it is possible to identify which self-checkout machines the divided images include based on the identification information items, distribute the divided images to the self-checkout machines to which the identified identification information items are attached, and display the divided images that have been distributed. That is, the cost required to prevent customers from committing fraud can be reduced without requiring a system modification cost that may be required according to the change in the layout of the self-checkout machines.

Third Example Embodiment

Figure 8:
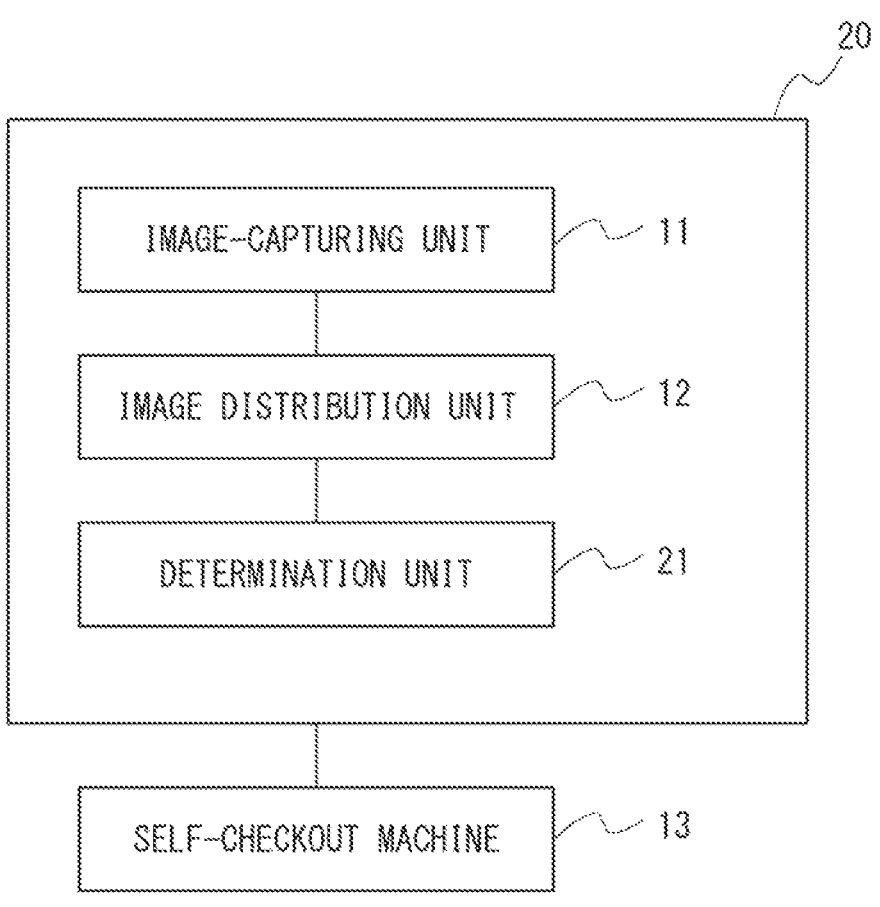
FIG. 8 is a block diagram showing a configuration of the self-checkout monitoring system according to the present disclosure.

Hereinafter, with reference to the drawings, a self-checkout monitoring system according to the present disclosure will be described. FIG. 8 is a block diagram showing a configuration of the self-checkout monitoring system according to the present disclosure. As shown in FIG. 8, a self-checkout monitoring system 20 includes an image-capturing unit 11, an image distribution unit 12, and a determination unit 21. Since the image-capturing unit 11 and the image distribution unit 12 are similar to those shown in FIGS. 1 and 3, the descriptions thereof will be omitted. A self-checkout machine 13 includes a display unit which displays customer's shopping information. The display unit displays the divided image of this self-checkout machine distributed from the image distribution unit 12.

The determination unit 21 determines, based on the divided image, whether or not a customer who is using the self-checkout machine included in the divided image may commit fraud. When, for example, the customer is looking around a predetermined number of times or more or the customer's hand is within a blind spot range of the image-capturing unit 11, the determination unit 21 determines that this customer may commit fraud.

Further, a storage unit (not shown) that stores behavioral patterns of fraud may be included, and when customer's behavior included in the divided image coincides with one of behavioral patterns of fraud stored in the storage unit, the determination unit 21 may determine that the customer may commit fraud.

Further, the determination unit 21 may determine that the customer may commit fraud when the customer's behavior included in the divided image partially coincides with the behavioral patterns of fraud stored in the storage unit (not shown) that stores behavioral patterns of fraud.

Figure 9:
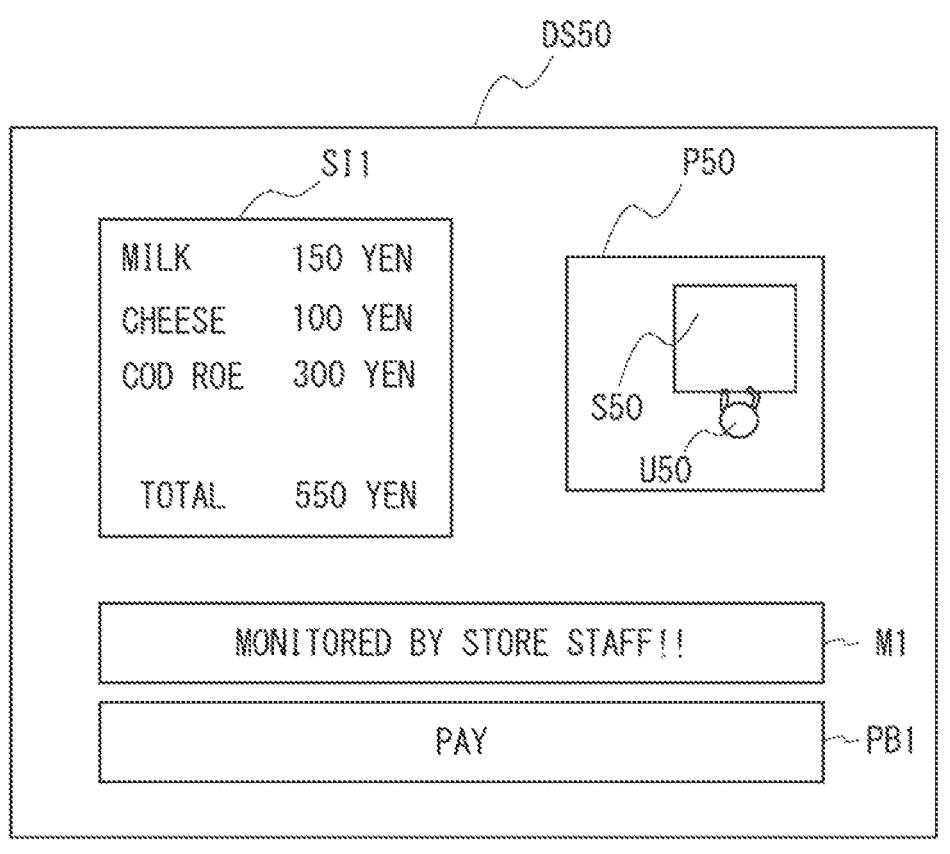
FIG. 9 is one example of the display unit of the self-checkout machine.

When the determination unit 21 has determined that the customer is committing fraud, the self-checkout monitoring system 20 further displays a warning sign on the display unit of the self-checkout machine. This configuration will be described in more detail with reference to FIG. 9. FIG. 9 is one example of the display unit of the self-checkout machine. In the example shown in FIG. 9, a customer U50 is using a self-checkout machine S50. A divided image P50 includes the self-checkout machine S50 and the customer U50. It is assumed here that the customer U50 is looking around a predetermined number of times or more.

The determination unit 21 determines that the customer U50 may commit fraud since the customer U50 included in the divided image P50 is looking around a predetermined number of times or more. In this case, the self-checkout monitoring system 20 causes a display unit DS50 of the self-checkout machine S50 to display a warning sign M1 in addition to shopping information SI1, the divided image P50, and a payment button PB1.

While the warning sign M1 is "Monitored by store staff!!" in the example shown in FIG. 9, this is merely an example. The warning sign may be any warning that can reduce the temptation for the customer U50 to commit fraud. Further, when the warning sign M1 is displayed on the display unit DS50 of the self-checkout machine S50, the self-checkout monitoring system 20 may transmit divided image P50 for a predetermined time before and after the display of the warning sign M1 to a storage unit (not shown). Accordingly, a store staff member can check later if the customer U50 has committed fraud.

As described above, the self-checkout monitoring system 20 notifies the customer that it is monitoring him/her by displaying a warning sign on the display unit of the self-checkout machine, whereby it is possible to reduce the customer's temptation to commit fraud.

<Self-Checkout Monitoring Method>

Figure 10:
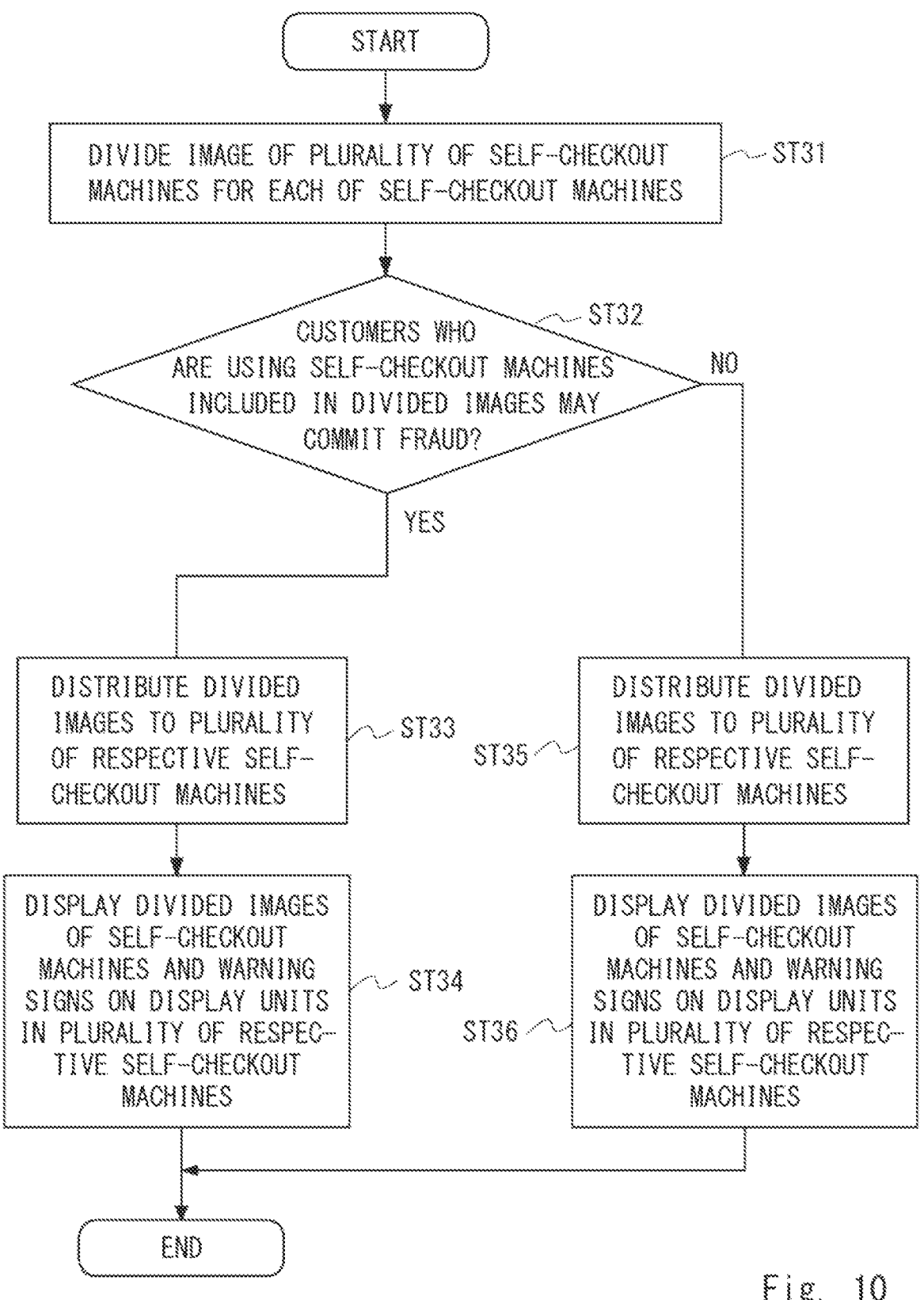
FIG. 10 is a flowchart illustrating a self-checkout monitoring method according to the present disclosure.

Next, a self-checkout monitoring method according to the present disclosure will be described. FIG. 10 is a flowchart illustrating the self-checkout monitoring method according to the present disclosure.

First, an image of a plurality of self-checkout machines captured from above is divided for each of the plurality of self-checkout machines (Step ST31). Step ST31 is the same as Step ST1 in FIG. 2.

Next, it is determined, based on the divided images, whether or not customers who are using the self-checkout machines included in the divided images may commit fraud (Step ST32). More specifically, it is determined whether or not the customers are looking around a predetermined number of times or more or whether or not the hands of the customers are within a blind spot range of the image-capturing unit 11.

When it is determined that the customers who are using the self-checkout machines included in the divided images may commit fraud (YES in Step ST32), the divided images are distributed to the plurality of respective self-checkout machines (Step ST33). More specifically, the divided images are distributed to the respective self-checkout machines included in the divided images.

Next, display units which display customer's shopping information in the plurality of respective self-checkout machines are caused to display the divided images of the self-checkout machines and warning signs (Step ST34). The self-checkout monitoring system 20 displays a warning sign for the self-checkout machine used by the customer who may commit fraud.

On the other hand, when it is determined that the customers who are using the self-checkout machines included in the divided images are not committing fraud (NO in Step ST32), the divided images are distributed to the plurality of respective self-checkout machines (Step ST35). More specifically, the divided images are distributed to the respective self-checkout machines included in the divided images.

In this case, display units which display customer's shopping information in the plurality of respective self-checkout machines are caused to display the divided images of the self-checkout machines (Step ST36).

Figure 11:
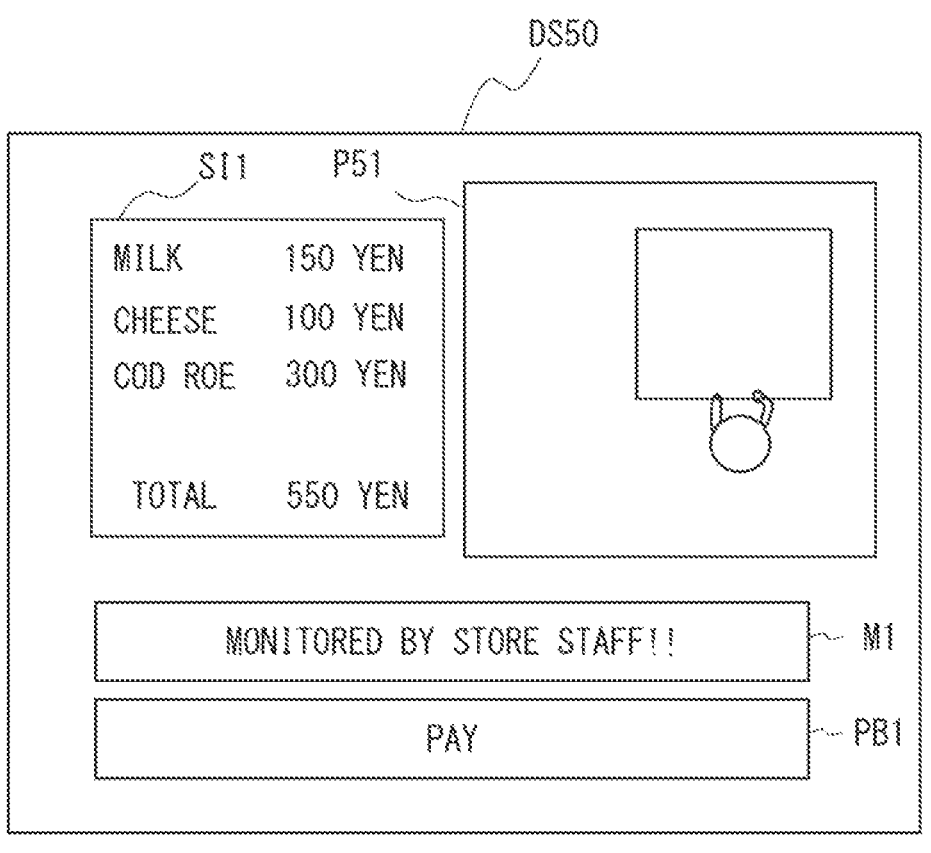
FIG. 11 is one example of the display unit of the self-checkout machine.

Further, when the determination unit 21 has determined that a customer is committing fraud, the divided image displayed on the display unit of the self-checkout machine may be enlarged. This configuration will be described in more detail with reference to FIG. 11. FIG. 11 is one example of the display unit of the self-checkout machine. Since a divided image P51 in FIG. 11 is an image obtained by enlarging the divided image P50 in FIG. 9 and the other configurations are similar to those shown in FIG. 9, the descriptions thereof will be omitted.

The determination unit 21 determines that the customer U50 included in the divided image P51 may commit fraud since he/she is looking around a predetermined number of times or more. In this case, the self-checkout monitoring system 20 causes the display unit DS50 of the self-checkout machine S50 to display the divided image P51 obtained by enlarging the divided image P50 shown in FIG. 9, as shown in FIG. 11.

Further, when the hand of the customer U50 is within a blind spot range of the image-capturing unit 11, the self-checkout monitoring system 20 may display only the arm of the customer U50 in the divided image P50 shown in FIG. 9 in an enlarged manner.

As described above, as shown in FIG. 11, the self-checkout monitoring system 20 causes the display unit of the self-checkout machine to display the divided image in addition to a warning sign in an enlarged manner. Accordingly, the customer is notified that the self-checkout monitoring system 20 is monitoring him/her, whereby it is possible to reduce the temptation of customers to commit fraud.

As described above, the self-checkout monitoring system 20 according to the present disclosure causes, when it is determined that a customer who is using a self-checkout machine included in a divided image may commit fraud, the divided image of this self-checkout machine and a warning sign to be displayed. Accordingly, the self-checkout monitoring system 20 notifies customers that it is monitoring them, whereby it is possible to reduce the temptation of customers to commit fraud. Further, a plurality of self-checkout machines are monitored by using one camera, whereby the cost required to prevent customers from committing fraud can be reduced. It is therefore possible to monitor fraud committed by customers at a low cost.

Further, a part or all of the processing in the aforementioned self-checkout monitoring system according to the present disclosure may be implemented as a computer program.

Note that the program includes instructions (or software codes) that, when loaded into a computer, cause the computer to perform one or more of the functions described in the example embodiments. The program may be stored in a non-transitory computer readable medium or a tangible storage medium. By way of example, and not a limitation, non-transitory computer readable media or tangible storage media can include a Random-Access Memory (RAM), a Read-Only Memory (ROM), a flash memory, a Solid-State Drive (SSD) or other types of memory technologies, a CD-ROM, a Digital Versatile Disc (DVD), a Blu-ray (Registered Trademark) disc or other types of optical disc storage, and magnetic cassettes, magnetic tape, magnetic disk storage or other types of magnetic storage devices. The program may be transmitted on a transitory computer readable medium or a communication medium. By way of example, and not a limitation, transitory computer readable media or communication media can include electrical, optical, acoustical, or other forms of propagated signals.

Although the present disclosure has been described above with reference to the above example embodiments, the present disclosure is not limited only to the configurations of the above-described example embodiments, and obviously includes various modifications, changes, and combinations that can be made by a person skilled in the art within the scope of the claims of the present application.

Each of the drawings or figures is merely an example to illustrate one or more example embodiments. Each figure may not be associated with only one particular example embodiment, but may be associated with one or more other example embodiments. As those of ordinary skill in the art will understand, various features or steps described with reference to any one of the figures can be combined with features or steps illustrated in one or more other figures, for example, to produce example embodiments that are not explicitly illustrated or described. Not all of the features or steps illustrated in any one of the figures to describe an example embodiment are necessarily essential, and some features or steps may be omitted. The order of the steps described in any of the figures may be changed as appropriate.

The whole or part of the example embodiments disclosed above can be described as, but not limited to, the following supplementary notes.

Supplementary Note 1

A self-checkout monitoring system comprising:

an image-capturing unit configured to capture an image of a plurality of self-checkout machines from above; and an image distribution unit configured to divide the image of the plurality of self-checkout machines captured by the image-capturing unit for each of the plurality of self-checkout machines and distribute the divided images to the plurality of respective self-checkout machines, wherein display units which display customer's shopping information in the plurality of respective self-checkout machines are caused to display the divided images of the self-checkout machines distributed from the image distribution unit.

Supplementary Note 2

The self-checkout monitoring system according to Supplementary Note 1, wherein identification information items for identifying the self-checkout machines are attached to the plurality of respective self-checkout machines, and the image distribution unit identifies the self-checkout machines included in the divided images based on the identification information items.

Supplementary Note 3

The self-checkout monitoring system according to Supplementary Note 1 or 2, further comprising a determination unit configured to determine, based on the divided images, whether or not a customer who is using a self-checkout machine included in the divided image may commit fraud, wherein, when the determination unit has determined that the customer is committing fraud, the display unit of the self-checkout machine is caused to further display a warning sign.

Supplementary Note 4

The self-checkout monitoring system according to Supplementary Note 3, wherein the determination unit determines that the customer is committing fraud when the customer is looking around a predetermined number of times or more.

Supplementary Note 5

The self-checkout monitoring system according to Supplementary Note 4, comprising enlarging, when the determination unit has determined that the customer is committing fraud, the divided image displayed on the display unit of the self-checkout machine.

Supplementary Note 6

A self-checkout monitoring method for causing a computer to execute processing of:

dividing an image of a plurality of self-checkout machines captured from above for each of the plurality of self-checkout machines and distributing the divided images to the plurality of respective self-checkout machines; and causing display units which display customer's shopping information in the plurality of respective self-checkout machines to display the divided images of the self-checkout machines that have been distributed.

Supplementary Note 7

The self-checkout monitoring method according to Supplementary Note 6, comprising identifying self-checkout machines included in the divided images based on identification information items for identifying the self-checkout machines attached to the self-checkout machines.

Supplementary Note 8

The self-checkout monitoring method according to Supplementary Note 6 or 7, comprising:

determining, based on the divided images, whether or not a customer who is using a self-checkout machine included in the divided image may commit fraud; and further causing the display unit of the self-checkout machine to display a warning sign when it is determined that the customer is committing fraud.

Supplementary Note 9

The self-checkout monitoring method according to Supplementary Note 8, comprising determining that the customer is committing fraud when the customer is looking around a predetermined number of times or more.

Supplementary Note 10

The self-checkout monitoring method according to Supplementary Note 9, comprising enlarging the divided images displayed on the display unit of the self-checkout machine when it is determined that the customer is committing fraud.

Supplementary Note 11

A self-checkout monitoring program causing a computer to execute processing of:

dividing an image of a plurality of self-checkout machines captured from above for each of the plurality of self-checkout machines and distributing the divided images to the plurality of respective self-checkout machines; and causing display units which display customer's shopping information in the plurality of respective self-checkout machines to display the divided images of the self-checkout machines that have been distributed.

Supplementary Note 12

The self-checkout monitoring program according to Supplementary Note 11, comprising identifying self-checkout machines included in the divided images based on identification information items for identifying the self-checkout machines attached to the self-checkout machines.

Supplementary Note 13

The self-checkout monitoring program according to Supplementary Note 11 or 12, comprising:

determining, based on the divided images, whether or not a customer who is using a self-checkout machine included in the divided image may commit fraud; and further causing the display unit of the self-checkout machine to display a warning sign when it is determined that the customer is committing fraud.

Supplementary Note 14

The self-checkout monitoring program according to Supplementary Note 13, comprising determining that the customer is committing fraud when the customer is looking around a predetermined number of times or more.

Supplementary Note 15

The self-checkout monitoring program according to Supplementary Note 14, comprising enlarging the divided images displayed on the display unit of the self-checkout machine when it is determined that the customer is committing fraud.

What is claimed is:

1. A self-checkout monitoring system comprising:

at least one memory storing instructions; and at least one processor configured to execute the instructions to:

capture an image of a plurality of self-checkout machines from above using at least one wide-angle camera installed at a position from which the at least one wide-angle camera captures the plurality of self-checkout machines at one time;

divide the captured image of the plurality of self-checkout machines for each of the plurality of self-checkout machines such that each respective portion of the divided image includes one self-checkout machine and distribute each respective portion of the divided image to the appropriate one of the plurality of respective self-checkout machines in real time;

and cause each display unit that displays customer shopping information in each of the plurality of respective self-checkout machines to display the respective portion of the divided image of the respective self-checkout machine that has been distributed to the appropriate one of the plurality of self-checkout machines, wherein a number of the at least one wide-angle camera is smaller than a number of the plurality of self-checkout machines.

2. The self-checkout monitoring system according to claim 1, wherein: identification information items for identifying the self-checkout machines are attached to the plurality of respective self-checkout machines; and the at least one processor identifies the self-checkout machines included in the divided images based on the identification information items.

3. The self-checkout monitoring system according to claim 1, wherein the at least one processor is configured to: determine, based on the divided images, whether or not a customer who is using a self-checkout machine included in the divided image may commit fraud; and cause the display unit of the self-checkout machine to further display a warning sign when it is determined that the customer is committing fraud.

4. The self-checkout monitoring system according to claim 3, wherein the at least one processor determines that the customer is committing fraud when the customer is looking around a predetermined number of times or more.

5. The self-checkout monitoring system according to claim 4, wherein the at least one processor enlarges, when it is determined that the customer is committing fraud, the respective portion of the divided image of the appropriate self-check-out machine which is displayed on the display unit of the appropriate self-checkout machine.

6. A self-checkout monitoring method for causing a computer to execute processing of:

dividing, for each of a plurality of self-checkout machines, an image of the plurality of self-checkout machines that is captured from above using at least one wide-angle camera installed at a position from which the at least one wide-angle camera captures the plurality of self-checkout machines at one time, such that each respective portion of the divided image includes one self-checkout machine, and distributing each respective portion of the divided image to the plurality of respective self-checkout machines in real time; and causing each display unit that displays customer shopping information in each of the plurality of respective self-checkout machines to display the respective portion of the divided image of the respective self-checkout machine that has been distributed to the appropriate one of the plurality of self-checkout machines, wherein a number of the at least one wide-angle camera is smaller than a number of the plurality of self-checkout machines.

7. The self-checkout monitoring method according to claim 6, further comprising identifying self-checkout machines included in the divided images based on identification information items for identifying the self-checkout machines attached to the self-checkout machines.

8. The self-checkout monitoring method according to claim 6, comprising: determining, based on the divided images, whether or not a customer who is using a self-checkout machine included in the divided image may commit fraud; and further causing the display unit of the self-checkout machine to display a warning sign when it is determined that the customer is committing fraud.

9. The self-checkout monitoring method according to claim 8, comprising determining that the customer is committing fraud when the customer is looking around a predetermined number of times or more.

10. The self-checkout monitoring method according to claim 9, comprising enlarging the respective portion of the divided image of the appropriate self-checkout which is displayed on the display unit of the appropriate self-checkout machine when it is determined that the customer is committing fraud.

11. A non-transitory computer readable medium storing a program for causing a computer to execute processing of:

dividing, for each of a plurality of self-checkout machines, an image of the plurality of self-checkout machines that is captured from above using at least one wide-angle camera installed at a position from which the at least one wide-angle camera captures the plurality of self-checkout machines at one time, such that each respective portion of the divided image includes one self-checkout machine, and distributing each respective portion of the divided image to the plurality of respective self-checkout machines in real time; and causing each display unit that displays customer shopping information in each of the plurality of respective self-checkout machines to display the respective portion of the divided image of the respective self-checkout machine that has been distributed to the appropriate one of the plurality of self-checkout machines, wherein a number of the at least one wide-angle camera is smaller than a number of the plurality of self-checkout machines.

12. The non-transitory computer readable medium according to claim 11, further comprising identifying self-checkout machines included in the divided images based on identification information items for identifying the self-checkout machines attached to the self-checkout machines.

13. The non-transitory computer readable medium according to claim 11, comprising: determining, based on the divided images, whether or not a customer who is using a self-checkout machine included in the divided image may commit fraud; and further causing the display unit of the self-checkout machine to display a warning sign when it is determined that the customer is committing fraud.

14. The non-transitory computer readable medium according to claim 13, comprising determining that the customer is committing fraud when the customer is looking around a predetermined number of times or more.

15. The non-transitory computer readable medium according to claim 14, comprising enlarging the respective portion of the divided image of the appropriate self-checkout which is displayed on the display unit of the appropriate self-checkout machine when it is determined that the customer is committing fraud.

* * * * *